(12) United States Patent
Koncelik, Jr.

(10) Patent No.: US 8,356,315 B2
(45) Date of Patent: Jan. 15, 2013

(54) SETTING TELEVISION DEFAULT CHANNEL

(76) Inventor: Lawrence J. Koncelik, Jr., East Hampton, NY (US)

( * ) Notice: Subject to any disclaimer, the term of this patent is extended or adjusted under 35 U.S.C. 154(b) by 1221 days.

(21) Appl. No.: 11/949,475

(22) Filed: Dec. 3, 2007

(65) Prior Publication Data

US 2009/0161023 A1  Jun. 25, 2009

(51) Int. Cl.
*H04N 7/025* (2006.01)
(52) U.S. Cl. .................. 725/32; 725/9; 725/47; 348/24
(58) Field of Classification Search ............. 725/32–36, 725/47, 78, 41; 348/24; 715/730, 747, 867
See application file for complete search history.

(56) References Cited

U.S. PATENT DOCUMENTS

| | | | |
|---|---|---|---|
| 3,961,267 A | 6/1976 | Weissmuller | 455/166.1 |
| 4,651,342 A | 3/1987 | Mengel | 455/151 |
| 4,837,627 A | 6/1989 | Mengel | |
| 4,876,736 A | 10/1989 | Kiewit | 455/2 |
| 5,430,493 A * | 7/1995 | Kim | 348/564 |
| 6,486,900 B1 * | 11/2002 | Shen et al. | 715/867 |
| 2001/0013124 A1 * | 8/2001 | Klosterman et al. | 725/36 |
| 2002/0104082 A1 * | 8/2002 | Fries | 725/32 |
| 2005/0289614 A1 * | 12/2005 | Baek et al. | 725/80 |

* cited by examiner

*Primary Examiner* — Pankaj Kumar
*Assistant Examiner* — Timothy Newlin
(74) *Attorney, Agent, or Firm* — Brown & Michaels, PC

(57) ABSTRACT

A television device is provided which is configured so that it will automatically cause a first predetermined television channel to be displayed on a television monitor when a television viewer sends a request signal to the television device to turn the television monitor off. The television device may be configured so that it will cause the television monitor to shut off after the first predetermined channel has been on for a dwell period of time after the request signal has been received. The dwell period of time may be approximately two seconds.

44 Claims, 2 Drawing Sheets

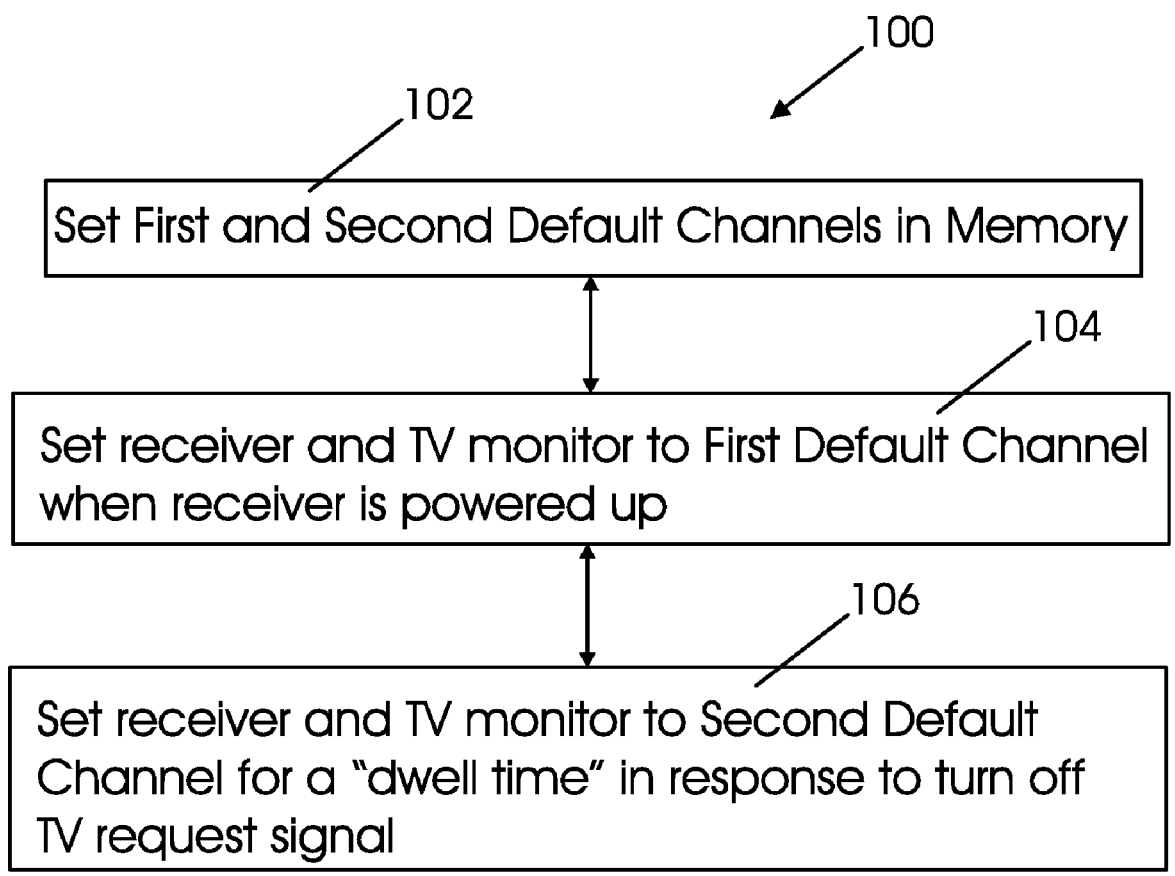

SETTING TELEVISION DEFAULT CHANNEL

FIELD OF THE INVENTION

This invention relates to improved methods and apparatus concerning the selection of television channels.

BACKGROUND OF THE INVENTION

There are various devices known in the prior art for setting television channels. U.S. Pat. No. 3,961,267 to Weissmueller provides a programmable tuning scanner which steps through preselected channels to allow an operator to stop at a desired channel. U.S. Pat. No. 4,876,736 to Kiewit provides the initial tuning of a default channel when a television is turned on following the television being turned off. (Kiewit, col. 3, lns. 45-53). It is unclear how this initial default channel is set or what it is set to, although it appears that the television would merely go back to the channel it was set to when it was turned off.

There is also a device known in the prior art which called "Cardio Theater" which is used at exercise facilities or gymnasiums. This device flicks to a predetermined channel, so that the channel number shows, and then a TV monitor is shut off. There is no dwell time and no image shown of the channel to which the television monitor is switched to.

SUMMARY OF THE INVENTION

One or more embodiments of the present invention provide an apparatus comprising: a television device. The television device may be configured so that it will automatically cause a first predetermined channel to be switched to and it will automatically cause one or more images currently being displayed on the first predetermined channel to be displayed on a television monitor when a television viewer sends a request signal to the television device to turn the television monitor off. The television device may be configured so that it will cause the television monitor to shut off after the first predetermined channel has been on for a dwell period of time after the request signal has been received. The dwell period of time may be approximately two seconds.

The television device may cause the first predetermined television channel to be displayed regardless of what television channel was being displayed on the television monitor at the time that the request signal was received. The television device may, for example, be a television receiver, a cable television tuner, a satellite television tuner, or an Advanced Television Systems Committee tuner. The request signal may be received from a remote control.

The television device may be configured so that an end user of the television can change the first predetermined channel. The television device may be configured so that the first predetermined channel is fixed by a manufacturer so that an end user cannot change it. The television device may be configured so that the first predetermined channel can be changed by a signal from a cable company, a television broadcasting company, or from a television satellite but can not legally be changed by an end user.

The television device may be configured so that it will automatically cause a first predetermined channel to be switched and it will automatically cause one or more images currently being displayed on the first predetermined channel to be displayed on a television monitor when a television viewer sends a request signal to the television device to turn the television monitor on. The first predetermined television channel may be set by a television signal provider, a cable television provider, a satellite television provider, or a television broadcast company.

One or more embodiments of the present invention also provide one or more methods. One such method may include receiving a request signal at a television device to turn a television monitor off, automatically causing a first predetermined channel to be switched to in response to receiving the request signal at the television device, and automatically causing one or more images currently being displayed on the first predetermined channel to be displayed on a television monitor in response to receiving the request signal at the television device.

BRIEF DESCRIPTION OF THE DRAWINGS

FIG. 2 shows a flow chart of a method for use with the apparatus of FIG. 1.

DETAILED DESCRIPTION OF THE DRAWINGS

Figure 1:
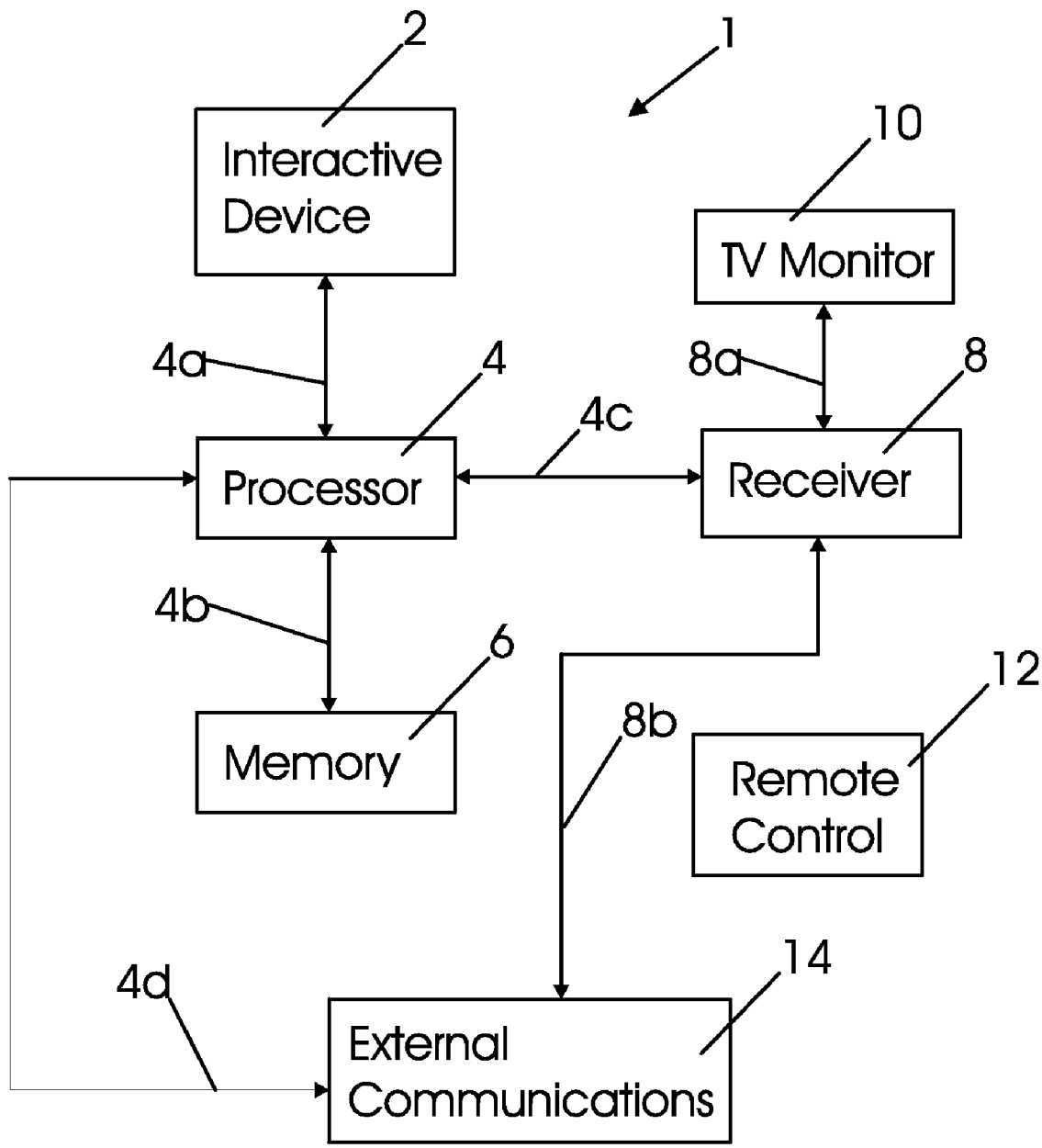
FIG. 1 shows a diagram of an apparatus in accordance with an embodiment of the present invention.

FIG. 1 shows a diagram of an apparatus 1. The apparatus 1 includes an interactive device 2, a processor 4, a memory 6, a receiver 8 or television device 8, TV (television) monitor 10, and a remote control 12. The apparatus 1 may be in communication with, or may include external communications 14. The interactive 2, memory 6, and receiver 8 are in communication with the processor 4 by communications lines 4a, 4b, and 4c, respectively, which may be hardwired, wireless, optical, or any other type of communications lines. The TV monitor 10 is in communication with the receiver 8 via communication line 8a, which may also be any type of communications line. The remote control 12 may communicate with the receiver 8 and/or with the processor 4 via wireless communication.

The interactive device 2 may include a computer keyboard, computer mouse, and/or any other interactive device or devices. The processor 4 may be a microprocessor, or any type of computer or electronic processor. The receiver 8 may be television tuner, cable television tuner, satellite tuner, ATSC (Advanced Television Systems Committee, relates to high definition television) Tuner and/or any other type of tuner used to select television channels and a tuner shall also include any type of radio tuner used in the selection of radio stations. The TV monitor 10 may be a computer display or television display or monitor.

The apparatus 1 may communicate with external communications 14. External communications 14 may include or represent a cable television feed or line, an Internet feed, or any other external communications. The external communications 14 may be connected to or in communication with the processor 4 via a communications line 4d, and or may be connected to or in communication with the receiver 8 via communications line 8b. The external communications 14 may include a signal or communications from a satellite television company such as Direct TV. The satellite signal may communicate with the processor 4 or with the receiver 8 by a remote communications link such as a TV or radio frequency signal. The communications lines 4d and 8b may include or may be wireless communications, such as the airwaves.

FIG. 2 shows a flow chart 100 of a method for use with the apparatus 1 of FIG. 1. The method of FIG. 1 includes step 102 at which first and second default channels are set in memory 6. The first and second default channels (and dwell time) may be set permanently so that they cannot be changed by a purchaser of an apparatus 1, or portions of an apparatus 1. The first and second default channels (and dwell time) may be set in a manner which makes it difficult to change them, but not impossible to change. In an alternative embodiment the first and second default channels (and dwell time) may be set, altered, or selectively programmed by a purchaser and/or user of the apparatus 1. Alternatively, the first and second default channels (and dwell time) may be permanently or temporarily by set the manufacturer of the apparatus or a portion of the apparatus. Alternatively, the first and second default channels (and dwell time) may be exclusively set or reset permanently or temporarily by a radio or television network or broadcasting or satellite company or cable company by sending a verified signal over a communications link, such as through an external communications or link 14 to the apparatus 1, such as to processor 4 or to receiver 8. For example, Cablevision (trademarked) could distribute an apparatus or portion of the apparatus 1 to its consumers. Cablevision (trademarked) could then have the ability to control the default stations and dwell times of their consumers by sending signals via external communications or link 14 to the processor 4 or receiver 8. For example, Cablevision (trademarked) could change the first and second default channels via the external communications link 14. When TV is powered on, the signal may be sent so that Cablevision (trademarked) 100 channel may be set to come on. When a request for shut down or power off signal is received, the default channel "100" may be set to come on for a dwell time that is pre programmed into a computer memory, such as memory 6, by any one or more of the programmers and or methods described above.

The method of FIG. 2 further includes step 104 at which the receiver 8 and the TV monitor 10 is set to a first default channel when the receiver is powered up. The first default channel is typically stored in memory 6. The processor 4 typically retrieves the first default channel from the memory 6 and causes the receiver 8 and the TV monitor 10 to be set to the first default channel, so that the images for the first default channel appear on the TV monitor 10. In at least one embodiment, this setting of the first default channel occurs automatically upon power up of the receiver 8 and TV monitor 10 regardless of what channel the receiver 8 and TV monitor 10 were tuned to immediately before the receiver 8 and TV monitor 10 were last turned off.

The method of FIG. 2 further includes step 106 at which the receiver 8 and the TV monitor 10 is set to a second default channel for a "dwell time" in response to a turn off TV request signal. A user via the interactive device 2 and/or via the remote control 12 may supply the turn off TV request signal. The turn off TV request signal may be processed by the receiver 8 and/or processor 4. Processor 4 may also include a receiver for receiving remote control signals from remote control 12 or may be supplied with remote control signals from receiver 8.

In one embodiment the first and second default channel may be the same channel. In other embodiments, the channels may be different.

When the receiver 8 and/or processor 4 receives the turn off TV request signal, the receiver 8 and/or the processor 4 may cause the TV channel to be changed to the second default channel and may also set a timer to the dwell time in the processor 4. After the dwell time, which may be for example five seconds, the receiver 8 and/or the processor 4 may cause the receiver 8 and the TV monitor 10 to shut off. Thus, in one embodiment, every time the receiver 8 and/or monitor 10 is turned off, the TV monitor 10 will display for a dwell time, such as five seconds, the images on a second default channel.

In another embodiment, the default off channel and the dwell time are programmed, not by the viewer, but by an operator pursuant to a verified signal from a remote location such as a signal from a television broadcasting, satellite or cable company.

In accordance with one or more embodiments of the present invention Cablevision (trademarked) or another TV signal provider such as Direct TV (trademarked) may sell a remote control tuner or receiver for receiver 8 shown in FIG. 1, that would have a first default channel of the cablevision channel as its "home channel". The channel might be, for instance, channel "100". In such an embodiment, whenever a viewer turns on his TV receiver, such as receiver 8 and TV monitor 10 they would display the images and sounds of the first default channel, which would typically be stored in memory, such as memory 6, or memory of the receiver 8, which in this embodiment would be cablevisions' channel 100. The viewer would then have to navigate to other channels from there to go to any other channel.

In another embodiment, when a viewer presses a button or otherwise requests that the receiver 8 (which may be a cable tuner) be turned off, the receiver 8 would first default to the second default channel which may also be selected by, for example, Cablevision (trademarked). In at least one embodiment, when a switch is activated which will ultimately will result in receiver 8 being switched off, the receiver 8 and the monitor 10 would not immediately switch off, but rather would default to, for example, channel "100" and dwell there for a brief time, for example five seconds, before the receiver 8 and TV monitor 10 shuts down.

In this embodiment Cablevision (trademarked), for example, profits from increased viewing audience during the time that the channel remains on either for the first default channel or the second default channel.

In an alternative embodiment, viewers including people with disabilities would benefit by having a first and second default channel in that they would always know what channel the television would turn on to, and what channel it would dwell on before it shut down.

While the embodiments described refer to television, in other embodiments, the techniques described can also be applied to radio receivers, and the setting of channels relating to radio.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising:

a television signal provider providing a television signal to a television device comprising a television monitor;

the television signal provider selecting a first predetermined television channel;

the television signal provider sending a first signal to the television device such that:

after the first signal is received by the television device, the television device automatically causes the television monitor to display the first predetermined television channel when the television device receives a first request to turn the television monitor off and one or more images currently being displayed on the first predetermined television channel are displayed on the television monitor in response to receiving the first request at the television device;

the television signal provider selecting a second predetermined television channel; and the television signal provider sending a second signal to the television device such that:

after the second signal is received by the television device, the television device automatically causes the television monitor to display the second predetermined television channel when the television device receives a second request to turn the television monitor off and one or more images currently being displayed on the second predetermined television channel are displayed on the television monitor in response to receiving the second request at the television device.

2. The method of claim 1 wherein
the first predetermined television channel is displayed for a predetermined dwell period of time after the first request is received by the television device prior to the television monitor turning off; and
the second predetermined television channel is displayed for the predetermined dwell period of time after the second request is received by the television device prior to the television monitor turning off.

3. The method of claim 1 wherein
the first predetermined television channel is displayed after the first request is received regardless of what television channel was being displayed on the television monitor at the time that the first request was received; and
the second predetermined television channel is displayed after the second request is received regardless of what television channel was being displayed on the television monitor at the time that the second request was received.

4. The method of claim 1 wherein
the television device further comprises a television receiver.

5. The method of claim 1 wherein
the television device further comprises a cable television tuner.

6. The method of claim 1 wherein
the television device further comprises an Advanced Television Systems Committee tuner.

7. The method of claim 2 wherein
the predetermined dwell period of time is approximately two seconds.

8. The method of claim 1 wherein
the first request and the second request are received from a remote control.

9. The apparatus method of claim 1 wherein
the television device further comprises a satellite television tuner.

10. The method of claim 1 wherein
the television signal is a cable television signal.

11. The method of claim 1 wherein
the television signal is a satellite television signal.

12. The method of claim 1 wherein
the television signal is a television broadcasting signal.

13. The method of claim 1 wherein
the first signal is provided by a communications link from the television signal provider to the television device and sets the first predetermined television channel in a computer memory of the television device; and
the second signal is provided by the communications link from the television signal provider to the television device and sets the second predetermined television channel in the computer memory of the television device.

14. The method of claim 1 further comprising
the television signal provider selecting a third predetermined television channel; and
the television signal provider sending a third signal to the television device such that:

after the third signal is received by the television device, the television device automatically causes the television monitor to display the third predetermined television channel when the television device receives a third request to turn the television monitor on and one or more images currently being displayed on the third predetermined television channel are displayed on the television monitor when the television monitor turns on in response to receiving the third request at the television device.

15. The method of claim 14 further comprising
the television signal provider selecting a first predetermined dwell period of time; and
the television signal provider sending a fourth signal to the television device such that:

after the fourth signal is received by the television device, the television device automatically causes the television monitor to display the third predetermined television channel when the television device receives a fourth request to turn the television monitor off, and in response to receiving the fourth request at the television device, one or more images currently being displayed on the third predetermined television channel are displayed on the television monitor for the first predetermined dwell period of time before the television monitor turns off.

16. The method of claim 1 further comprising
the television signal provider selecting a first predetermined dwell period of time; and
the television signal provider sending a third signal to the television device such that:

after the third signal is received by the television device, the television device automatically causes the television monitor to display the second predetermined television channel when the television device receives a third request to turn the television monitor off, and in response to receiving the third request at the television device, one or more images currently being displayed on the second predetermined television channel are displayed on the television monitor for the first predetermined dwell period of time before the television monitor turns off.

17. The method of claim 1, wherein an end user can not change the first predetermined television channel or the second predetermined television channel.

18. The method of claim 1, wherein the first signal and the second signal are verified signals.

19. The method of claim 1, wherein the first predetermined television channel and the second predetermined television channel are exclusively set by the television signal provider.

20. A method comprising:
a television signal provider providing a television signal to a television device comprising a television monitor;
the television signal provider selecting a first predetermined television channel;
the television signal provider sending a first signal to the television device such that:
after the first signal is received by the television device, the television device automatically causes the television monitor to display the first predetermined television channel when the television device receives a first request to turn the television monitor on and one or more images currently being displayed on the first predetermined television channel are displayed on the television monitor in response to receiving the first request at the television device;

the television signal provider selecting a second predetermined television channel; and the television signal provider sending a second signal to the television device such that:

after the second signal is received by the television device, the television device automatically causes the television monitor to display the second predetermined television channel when the television device receives a second request to turn the television monitor on and one or more images currently being displayed on the second predetermined television channel are displayed on the television monitor in response to receiving the second request at the television device.

21. The method of claim 20 wherein the television signal provider is a cable television company signal.

22. The method of claim 20 wherein the television provider is a satellite television signal.

23. The method of claim 20 wherein the television provider is a television broadcasting signal.

24. The method of claim 20 wherein the first signal is provided by a communications link from the television signal provider to the television device and sets the first predetermined television channel in a computer memory of the television device; and the second signal is provided by the communications link from the television signal provider to the television device and sets the second predetermined television channel in the computer memory of the television device.

25. The method of claim 20 further comprising the television signal provider selecting a third predetermined television channel; and the television signal provider sending a third signal to the television device such that:

after the third signal is received by the television device, the television device automatically causes the television monitor to display the third predetermined television channel when the television device receives a third request to turn the television monitor off and one or more images currently being displayed on the third predetermined television channel are displayed on the television monitor in response to receiving the third request at the television device.

26. The method of claim 25 further comprising the television signal provider selecting a first predetermined dwell period of time; and the television signal provider sending a fourth signal to the television device such that:

after the fourth signal is received by the television device, the television device automatically causes the television monitor to display the third predetermined television channel when the television device receives a fourth request to turn the television monitor off, and in response to receiving the fourth request at the television device, one or more images currently being displayed on the third predetermined television channel are displayed on the television monitor for the first predetermined dwell period of time before the television monitor turns off.

27. The method of claim 20 further comprising the television signal provider selecting a first predetermined dwell period of time; and the television signal provider sending a third signal to the television device such that:

after the third signal is received by the television device, the television device automatically causes the television monitor to display a television channel when the television device receives a third request to turn the television monitor off, and in response to receiving the third request at the television device, one or more images currently being displayed on the television channel are displayed on the television monitor for the first predetermined dwell period of time before the television monitor turns off.

28. The method of claim 20, wherein an end user can not change the first predetermined television channel or the second predetermined television channel.

29. The method of claim 20, wherein the first signal and the second signal are verified signals.

30. The method of claim 20, wherein the first predetermined television channel and the second predetermined television channel are exclusively set by the television signal provider.

31. A method comprising:

a television signal provider providing a television signal to a television device comprising a television monitor;

the television signal provider selecting a first predetermined television channel;

the television signal provider sending a first signal to the television device such that:

after the first signal is received by the television device, the television device automatically causes the television monitor to display the first predetermined television channel when the television device receives a first request to turn the television monitor off and one or more images currently being displayed on the first predetermined television channel are displayed on the television monitor in response to receiving the first request at the television device;

the television signal provider selecting a second predetermined television channel; and the television signal provider sending a second signal to the television device such that:

after the second signal is received by the television device, the television device automatically causes the television monitor to display the second predetermined television channel when the television device receives a second request to turn the television monitor on and one or more images currently being displayed on the second predetermined television channel are displayed on the television monitor when the television monitor turns on in response to receiving the second request at the television device.

32. The method of claim 31 further comprising the television signal provider selecting a first predetermined dwell period of time; and the television signal provider sending a third signal to the television device such that:

after the third signal is received by the television device, the television device automatically causes the television monitor to display the first predetermined television channel when the television device receives a third request to turn the television monitor off, and in response to receiving the third request at the television device, one or more images currently being displayed on the first predetermined television channel are displayed on the television monitor for the first predetermined dwell period of time before the television monitor turns off.

33. The method of claim 31, wherein an end user can not change the first predetermined television channel or the second predetermined television channel.

34. The method of claim 31, wherein the first signal and the second signal are verified signals.

35. The method of claim 31, wherein the first predetermined television channel and the second predetermined television channel are exclusively set by the television signal provider.

36. A method comprising:
a television signal provider providing a television signal to a television device comprising a television monitor;
the television signal provider selecting a first predetermined dwell period of time; and
the television signal provider sending a first signal to the television device such that:
after the first signal is received by the television device, the television device automatically causes the television monitor to display a television channel when the television device receives a first request to turn the television monitor off, and in response to receiving the first request at the television device, one or more images currently being displayed on the television channel are displayed on the television monitor for the first predetermined dwell period of time before the television monitor turns off.

37. The method of claim 36 wherein
the first predetermined dwell period of time is approximately two seconds.

38. The method of claim 36 wherein
the first signal is provided by a communications link from the television signal provider to the television device and sets the first predetermined dwell period of time in a computer memory of the television device.

39. The method of claim 36 further comprising
the television signal provider selecting a second predetermined dwell period of time; and
the television signal provider sending a second signal to the television device such that:
after the second signal is received by the television device, the television device automatically causes the television monitor to display the television channel when the television device receives a second request to turn the television monitor off, and in response to receiving the second request at the television device, one or more images currently being displayed on the television channel are displayed on the television monitor for the second predetermined dwell period of time before the television monitor turns off.

40. The method of claim 36 further comprising
the television signal provider selecting a first predetermined television channel as the television channel; and
the television signal provider sending a second signal to the television device such that:
after the second signal is received by the television device, the television device automatically causes the television monitor to display the first predetermined television channel when the television device receives a second request to turn the television monitor off and one or more images currently being displayed on the first predetermined television channel are displayed on the television monitor in response to receiving the second request at the television device.

41. The method of claim 36 further comprising
the television signal provider selecting a first predetermined television channel; and
the television signal provider sending a second signal to the television device such that:
after the second signal is received by the television device, the television device automatically causes the television monitor to display the first predetermined television channel when the television device receives a second request to turn the television monitor on and one or more images currently being displayed on the first predetermined television channel are displayed on the television monitor in response to receiving the second request at the television device.

42. The method of claim 36, wherein an end user can not change the first predetermined dwell period of time.

43. The method of claim 36, wherein the first signal is a verified signal.

44. The method of claim 36, wherein the first predetermined dwell period of time is exclusively set by the television signal provider.

* * * * *

UNITED STATES PATENT AND TRADEMARK OFFICE
CERTIFICATE OF CORRECTION

PATENT NO. : 8,356,315 B2
APPLICATION NO. : 11/949475
DATED : January 15, 2013
INVENTOR(S) : Koncelik, Jr.

Page 1 of 1

It is certified that error appears in the above-identified patent and that said Letters Patent is hereby corrected as shown below:

Claim 21 (Column 7, line 24): replace "television signal provider" with "television signal"

Claim 21 (Column 7, lines 24-25): replace "cable television company signal" with "cable television signal"

Claim 22 (Column 7, line 27): replace "television provider" with "television signal"

Claim 23 (Column 7, line 29): replace "television provider" with "television signal"

Signed and Sealed this
Twelfth Day of March, 2013

Teresa Stanek Rea
*Acting Director of the United States Patent and Trademark Office*